March 8, 1932. F. W. TULLY 1,848,444
TIRE CHAIN
Filed Dec. 16, 1930
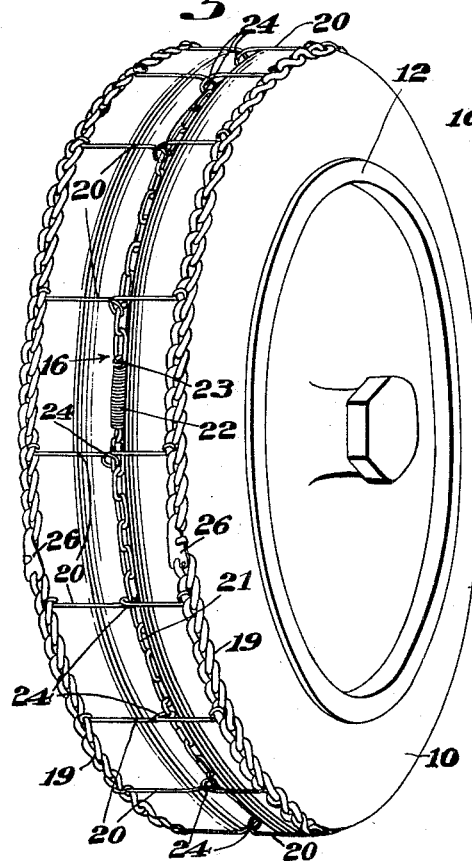
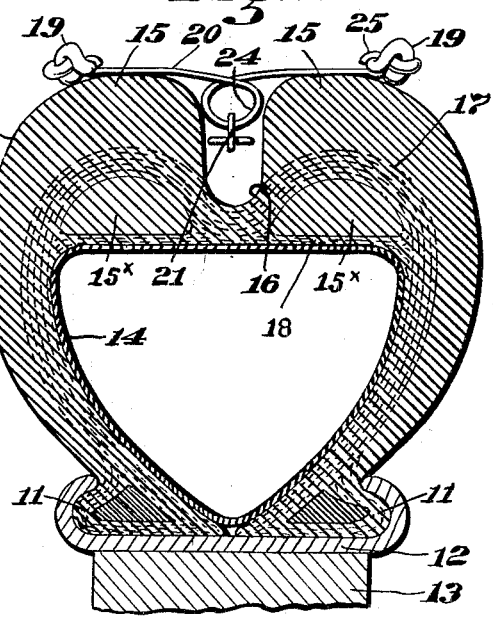
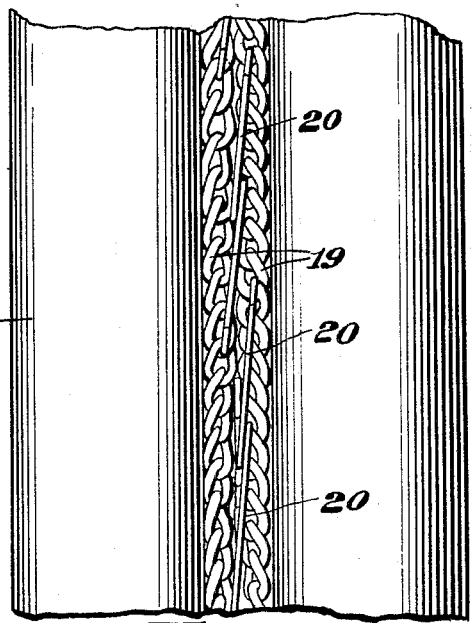
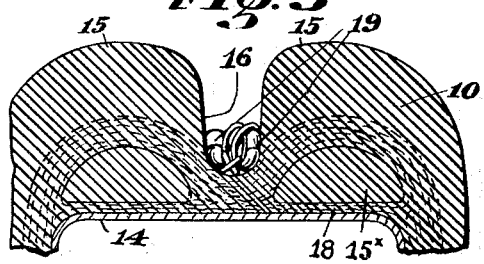
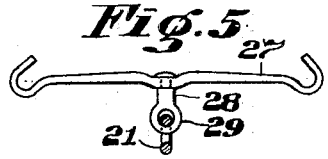
INVENTOR
Francis W. Tully
BY
ATTORNEY Patented Mar. 8, 1932

1,848,444

UNITED STATES PATENT OFFICE

FRANCIS W. TULLY, OF CHESTNUT HILL, MASSACHUSETTS

TIRE CHAIN

Application filed December 16, 1930. Serial No. 502,652.

This invention relates to anti-skidding devices designed primarily for use upon a special type of pneumatic tire having a channel formed longitudinally of its tread.

The anti-skidding devices now commonly used upon pneumatic tires and upon many solid tires comprise a pair of side chains connected by transversely extending chains that extend across the tread of the tire to form the traction elements. The side chains do not increase the traction between the tire and road but serve to hold the transversely extending chains in place.

Although these tire chains are extensively used, they are open to the objection that a more or less noticeable shock is imparted to the wheels of the vehicle as they run over the cross chains.

One of the purposes of the present invention is to overcome this objectionable feature of the tire chains employed heretofore, and the same is accomplished, in accordance with the present invention, by forming the traction chains so that they extend longitudinally of the tire tread in position to contact with the road throughout their length. This arrangement of the traction chains longitudinally of the tire instead of transversely, as heretofore, causes the chains to run smoothly along the road bed and relieve the wheels from the shocks caused heretofore by running over the cross chains.

A further feature of the present invention resides in means for retaining the longitudinally extending traction chains in place upon the tread portion of a tire, and this is accomplished when the anti-skidding device is used upon a tire having a channel formed longitudinally of its tread, by connecting the longitudinally extending traction chains to anchoring means within said channel.

Another important feature of the invention resides in an anti-skidding device which is constructed to utilize the longitudinally extending channel of the tire to house the traction chains when not used to prevent skidding, and to retain the traction chains in place upon the tread of the tire when used to prevent skidding. The arrangement is such that a tire chain may remain on the tire when in use and also when not in use, thus making it unnecessary to remove the anti-skidding device from a tire in order to stop using the same.

A further feature of the invention resides in the construction of the connecting links between the traction chains, and in the means for anchoring these links in the tire channels so that the links and attached traction chains may be readily folded into the tire channel when not in use, and may be readily removed therefrom into operative position upon the tire, largely by the centrifugal force of the rotating chains.

Still a further feature of the invention resides in a pneumatic tire provided with a channel formed longitudinally of its tread and of a size and shape to permit the confining of the entire anti-skidding device therein when not in use.

Other features of the invention and novel cooperation of parts, in addition to the above, will be hereinafter described in connection with the accompanying drawings which illustrate good practical forms of the invention.

In the drawings:—

Fig. 1 is a perspective view of a wheel equipped with a channeled pneumatic tire and provided with the anti-skidding device of the present invention.

Fig. 2, on an enlarged scale, is a transverse sectional view through the tire, rim and anti-skidding device of Fig. 1.

Fig. 3 is a sectional view through the tire of Fig. 2, but shows the anti-skidding device folded or housed in the channel of the tire out of use.

Fig. 4 is a face view of part of the tire of Fig. 1 showing the anti-skidding device housed in the channel, and Fig. 5 is a side elevation of a modified form of connecting link or spreader for connecting the chains.

While certain features of the anti-skidding device of the present invention may be employed in connection with dual tires, either solid or pneumatic, the present device is designed more particularly for use upon a special type of pneumatic tire having a central channel extending longitudinally of the tread, as shown in the drawings.

The shoe or tire 10, illustrated in the drawings, is provided with the usual beaded portions 11 for securing the same to a rim 12 of well known construction, and which is mounted upon the felly 13 of an automobile or truck wheel. Within the tire or shoe 10 is confined the usual inner tube 14 adapted to be inflated.

The tread portion 15 of the tire 10 differs from that of the pneumatic tires now in general use in that this tread portion is provided with a central longitudinally extending channel 16 which is relatively large as shown, and extends inwardly through the rubber traction surface 15 of the tire and into a heart-shaped depression formed in the underlying fabric structure 17. This construction is desirable in order to form a channel that is sufficiently deep to retain the chains therein after the tread 15 has been largely worn away. Sufficient strength may be imparted to this portion of the tire by providing the additional fabric structure 18 extending from one side wall of the shoe to the other, and the space between the fabric structure 17 and 18 at each side of the channel 16 may be filled with rubber as indicated by 15$^x$. The construction of the channel 16 is preferably such that it is large enough to permit the entire anti-skidding device to be housed or confined therein, out of contact with the road when not in use, as shown in Figs. 3 and 4, and this is true after the tread 15 is worn down approximately to the fabric 17.

While the anti-skidding device shown in the drawings is provided with spaced longitudinally extending chains 19 which are connected by the transversely extending links 20, the present construction differs from the tire chains employed heretofore in that the links 20, as illustrated, are relatively small as compared with the cross sectional area of the chains 19 and as a result will extend outwardly from the tread surface of the tire to a less degree than the chains 19, as will be apparent from Fig. 2. Furthermore the construction of the links 20 is such that they will maintain the traction chains 19 upon the tread 15 of the tire in position to contact with the road surface throughout their length to present a smooth continuous running surface for the wheel, and the chains 19 rather than the cross links 20 receive the major portion of the wear to which the anti-skidding device is subjected.

Since in accordance with the present invention the traction chains 19 are retained upon the tread of the tire having the greatest, or approximately the greatest diameter, rather than at the opposite sides of the tread as heretofore, it is necessary to provide a special construction for retaining these traction chains in place upon the tread or wear receiving portion of the tire. This is accomplished by making the connecting links or spreaders 20 shorter in length than the cross chains, commonly employed heretofore, and by securing these links intermediate their ends to anchoring means confined within the longitudinally extending channel 16. The anchoring means in the construction shown comprises a chain 21, which may be of lighter structure than the traction chains 19 and the chain 21 extends entirely around the annular channel 16 and may be secured therein by providing this chain with a spring 22 having a hook 23 at one end, adapted to be engaged with a link at the opposite end of the chain 21. While in the construction shown the chain 21 has been illustrated as the anchoring means retained in the channel 16, it will be apparent that a cable, strong rope, or other form of band may be employed to this end.

In the construction shown in Figs. 1 to 4 inc. the links 20 are formed of resilient bars or rods bent intermediate their ends to form the loop portion 24 and each link is provided at its opposite ends with the hooks 25 adapted to be closed about links of the chains 19, as will be apparent from the drawings. The links 20 are conveniently secured to the anchoring chain 21 by inserting an end of the link or spreader 20 through a link of the anchoring chain to engage the central looped portion of the spreader, with a link of the anchoring chain as will be apparent from Fig. 2, whereupon the loop 24 may be closed by forcing the crossing portions thereof into contacting relation with each other. As a result of this construction the links 20 maintain the traction chains 19 in the desired position upon the tread of the tire, while at the same time the links may be swung with respect to the anchoring chain 21 from the transverse position in which they are shown in Figs. 1 and 2 to the folded or longitudinally extending position in which they are shown in Figs. 3 and 4. These links 20 may be bent slightly or placed under resilient tension as they are forced into substantially parallel relation with the anchoring chain 21, as shown in Fig. 4, but this is desirable in many cases because if these links are maintained under tension while in the channel they will help to throw the chains 19 out of the channel when it is desired to bring the anti-skidding device into use to prevent the wheel from skidding.

Each traction chain 19 is provided at one end with a hook 26 of any desired construction and adapted to be engaged with the opposite end of the chain as will be apparent from Fig. 1, to hold the chain about the tire in the form of a loop. When it is desired to confine these chains 19 in the channel 16 this is readily accomplished by releasing the hooks 26, and by pulling upon one chain 19 relative to the other to swing the cross links 20 about their central portion as a pivot, in order to bring the chains 19 and links 20 into their folded position within the channel 20, whereupon the parts are retained therein by drawing the chains 19 tight to reduce their diameter and fasten the hooks 26 to their chains at some distance from the ends so that the diameter of these chains is sufficiently reduced to prevent the chains and links from escaping from the channel 16. As long as the anti-skidding device is entirely confined within the channel 16, as shown in Fig. 4 the chains will remain out of use, free from wear and the tire will run smoothly upon its tread 15.

When it is desired to bring the anti-skidding device into use to prevent a wheel from skidding this is readily done by simply letting out each chain 19 by engaging the hooks 26 with the end of the respective chains. As soon as this is done the automobile provided with the present anti-skidding device may be driven and the centrifugal force, together with the spring action of the links 20 will cause the traction chains 19 to move out of the channel and into their running position in which they are shown in Fig. 1.

It will therefore be seen that is is a comparatively simple operation, after the present device has been applied to a tire by securing the anchoring chain 21 in the channel 16, to shift the traction chains 19 to and from their skid preventing position, without the necessity of taking the chains entirely off a tire or placing them thereon, as heretofore.

If, in driving an automobile equipped with tires and chains constructed in accordance with the present invention, it should seem advisable, due to the weather condition, to entirely remove the anti-skidding device from the tires this may be done by disconnecting the hooks 26 of the traction chains 19 and the hook 23 of the anchoring chain 21, whereupon the anti-skidding device may be entirely removed from the tire, and the tires will operate without the chains, similar to other tires now in use.

In some cases it may be desirable to make the connecting links or spreaders 20 heavier and larger than shown in Figs. 1 to 4 inc., in which case the modified construction of Fig. 5 may be employed in which the central portion of the spreader 27 has pivotally secured thereto the swivel 28 which is provided with the eyelet 29 adapted to be engaged with a link of the chain or other anchoring means 21. If desired, this link or spreader 27 may be relatively large as compared with the chains 19 so that it will increase the traction or nonskidding action of the anti-skidding device. The swivel construction of Fig. 5, just described, will permit the traction chains 19 and links 27 to be folded into the channel 16 the same as in the construction shown in Figs. 1 to 4 inc., and it will be apparent that various other means may be employed for connecting the cross links 27 to the anchoring means 21 so that these links may be rotated relative to the anchoring means.

While the traction elements 19 have been shown and described as "chains" it is to be understood that other forms of belts or bands provided with barbs or other means for producing the desired traction may be employed and that the claims are therefore to be construed as covering not only chains, as the traction elements 19, but other forms of belts or bands employed to this end.

It will be understood from the foregoing that the present invention does away with the necessity of frequently putting chains on and taking them off a wheel as heretofore, since it is comparatively a simple operation to shift the traction chains 19 of the present device from their active position upon the tire to their inactive position within the channel 16, or vice versa.

Furthermore a wheel equipped with the present anti-skidding device having continuous traction chains surrounding its tread portion will run more smoothly than a wheel equipped with a prior type of tire chain provided with cross traction elements. The anti-skidding device of the present invention is more durable than the former types of tire chains due to the fact that it runs smoother over the road surface and is not subjected to the injurious bumping action of the prior constructions.

What is claimed is:—

1. An anti-skidding device for tires having a channel formed longitudinally in the tread, comprising flexible anchoring means secured in said channel, chains encircling the tread of the tire at the opposite sides of the channel, and connections between said anchoring means and chains adapted to utilize the channel construction for holding the chains upon the tread in position to contact with the road surface throughout their length.

2. An anti-skidding device for tires having a channel formed longitudinally in the tread, comprising a flexible anchoring band removably secured in said channel, traction chains encircling the tread of the tire at the opposite sides of the channel, and bar connections between said anchoring band and chains adapted to utilize the channel construction for holding the chains upon the tread in position to form continuous traction bands between the tire tread and road.

3. An anti-skidding device for tires having a channel formed longitudinally in the tread, comprising anchoring means secured in said channel, chains encircling the tread of the tire at each side of the channel, and resilient connecting bars between said anchoring means and chains and adapted to hold the chains upon the tread from the channel construction in position to contact with the road surface throughout their length.

4. An anti-skidding device for tires having a channel formed longitudinally in the tread, comprising anchoring means secured in said channel, chains encircling the tread of the tire at the opposite sides of the channel to contact with the road surface throughout their length, and connecting links between said anchoring means and chains for holding the chains upon the tread from the channel construction and arranged so that the chains and links may be carried entirely within the channel when not used to prevent skidding.

5. An anti-skidding device for tires having a channel formed longitudinally of the tread, comprising anchoring means secured in said channel, traction chains encircling the tread of the tire at each side of said channel to contact with the road surface throughout their length, and bar connecting links between said chains and pivotally secured to said anchoring means to hold the chains on the tread from the channel construction and adapted to be swung to a position longitudinally of said channel so that the chains and links may be carried in the channel when not used to prevent skidding.

6. An anti-skidding device for tires having a channel formed longitudinally of the tread, comprising traction chains constructed to encircle the tire tread to contact with the road throughout their length and arranged to be confined in said channel when not in use, and anchoring means in said channel and connected to the chains so that the latter may be thrown outwardly by centrifugal force into their skid preventing position upon letting the chains out to increase their diameter.

7. An anti-skidding device for tires having a channel formed longitudinally of the tread, comprising traction chains constructed to encircle the tire tread longitudinally of the tire and arranged to be confined in said channel when not in use by taking the chains up to decrease their diameter, and means for retaining the chains on the tread surface of the tires while in use to contact with the road throughout their length for prevention of skidding.

8. An anti-skidding device for tires having a channel formed longitudinally of the tread, comprising anchoring means secured in said channel, traction chains encircling the tread of the tire to contact with the road through their length, and bar connecting links between said chains and pivotally secured to said anchoring means so that the chains and links may be shifted from an active to an inactive position by pulling one chain in the direction of its length thereby moving each chain relative to the other to swing the chains and links into said channel.

9. An anti-skidding device for tires having a channel formed longitudinally of the tread, comprising anchoring means secured in said channel, bars pivotally connected to said anchoring means to extend transversely of the tire, chains connected to the ends of said bars and arranged so that the bars and chains may be swung into said channel when not in use by pulling one chain in the direction of its length relative to the other.

10. An anti-skidding device for tires having a channel formed longitudinally of the tread, comprising anchoring means secured in said channel, traction chains constructed to encircle the tire tread to contact with the road bed throughout their length and to be confined in said channel when not in use, and flexible connections between said anchoring means and chains and adapted to be tensioned while in said channel to cause them to spring out of the channel when released.

11. An anti-skidding device for tires having tread portions and an annular channel between the tread portions, comprising anchoring means secured in said channel, traction chains encircling said tread portions at each side of the channel, connections between said anchoring means and traction chains for holding the chains upon the tread portions from the channel construction and arranged so that the chains may be confined in said channel when not in use by placing them into the channel and reducing the circumferential length of the chains.

12. An anti-skidding device for tires having tread portions and an annular channel between the tread portions, comprising non-skidding chains encircling said tread portions at each side of the channel, an anchoring chain adapted to have its ends connected to form an encircling band in said channel, and means for connecting the non-skidding chains to said anchoring chains to hold the former chains upon the tread portions and so that they may be moved from their tread engaging position into the channel when not in use to confine these chains and said connecting means therein.

In testimony whereof, I have signed my name to this specification.

FRANCIS W. TULLY.